US011038811B2

(12) United States Patent
Chapman et al.

(10) Patent No.: US 11,038,811 B2
(45) Date of Patent: Jun. 15, 2021

(54) WATERFALL GRANTING

(71) Applicant: Cisco Technology, Inc., San Jose, CA (US)

(72) Inventors: John T. Chapman, Coto de Caza, CA (US); Tong Liu, Acton, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 153 days.

(21) Appl. No.: 15/983,023

(22) Filed: May 17, 2018

(65) Prior Publication Data

US 2018/0337868 A1 Nov. 22, 2018

Related U.S. Application Data

(60) Provisional application No. 62/507,425, filed on May 17, 2017.

(51) Int. Cl.
| | |
|---|---|
| *H04L 12/911* | (2013.01) |
| *H04L 12/927* | (2013.01) |
| *H04L 12/801* | (2013.01) |
| *H04L 12/851* | (2013.01) |
| *H04L 12/28* | (2006.01) |
| *H04L 12/863* | (2013.01) |
| *H04N 21/61* | (2011.01) |

(52) U.S. Cl.
CPC ........ *H04L 47/782* (2013.01); *H04L 12/2898* (2013.01); *H04L 47/24* (2013.01); *H04L 47/2441* (2013.01); *H04L 47/39* (2013.01); *H04L 47/623* (2013.01); *H04L 47/6215* (2013.01); *H04L 47/805* (2013.01); *H04N 21/6168* (2013.01); *H04L 12/2889* (2013.01)

(58) Field of Classification Search
None
See application file for complete search history.

(56) References Cited

FOREIGN PATENT DOCUMENTS

| WO | 0162008 A2 | 8/2001 | |
|---|---|---|---|
| WO | WO-0162008 A2 * | 8/2001 | ......... H04L 12/2801 |

OTHER PUBLICATIONS

MAC and Upper Layer Protocols Interface Specifications _ Data-Over-Cable Service Interface Specifications DOCSIS 3.0, Jan. 11, 2017 (Jan. 11, 2017).*

(Continued)

*Primary Examiner* — Peter Chen
*Assistant Examiner* — Jeff Banthrongsack
(74) *Attorney, Agent, or Firm* — Merchant & Gould P.C.

(57) ABSTRACT

Waterfall granting may be provided. First, a plurality of grants may be received for a service flow. Then a first plurality of packets may be placed in a first queue associated with the service flow in response to determining that the first plurality of packets corresponding to the service flow are associated with a first quality of service level. Next, a second plurality of packets may be placed in a second queue associated with the service flow in response to determining that the second plurality of packets corresponding to the service flow are associated with a second quality of service level. The first plurality of packets in the first queue may then be serviced from the plurality of grants until all the first plurality of packets in the first queue are serviced before servicing any of the second plurality of packets in the second queue with remaining ones of the plurality of grants.

20 Claims, 5 Drawing Sheets

(56) References Cited

OTHER PUBLICATIONS

"International Search Report and Written Opinion Issued in PCT/US2018/033284", dated Jul. 23, 2018, 29 Pages.
Cablelabs: "MAC and Upper Layer Protocols Interface Specification", Data-Over-Cable Service Interface Specification—DOCSIS 10, Jan. 11, 2017 (Jan. 11, 2017), XP055492550, Retrieved from the Internet: URL:https//apps.cablelabs.com/specification/CM-SP-MULPIv3.0?v=30 [retrieved on Jul. 18, 2018].

* cited by examiner

WATERFALL GRANTING

RELATED APPLICATION

Under provisions of 35 U.S.C. § 119(e), Applicants claim the benefit of U.S. provisional application No. 62/507,425, filed May 17, 2018, which is incorporated herein by reference.

TECHNICAL FIELD

This disclosure relates in general to the field of communications and, more particularly, techniques for reducing latency.

BACKGROUND

Communication systems may include separate wireless and wireline portions, each of which may be owned and controlled by different operators. Even though some cable operators, also known as Multiple System Operators (MSOs) use Data Over Cable Service Interface Specification (DOCSIS) networks for backhauling Internet traffic, separate networks, such as mobile core, DOCSIS, and radio, have limited to no visibility into parts of the other network types. Each network type, such as DOCSIS and LTE, have separate traffic scheduling processes. As a result, when these types of networks are networks are combined, the resulting architecture may be inefficient and may result in longer latency.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
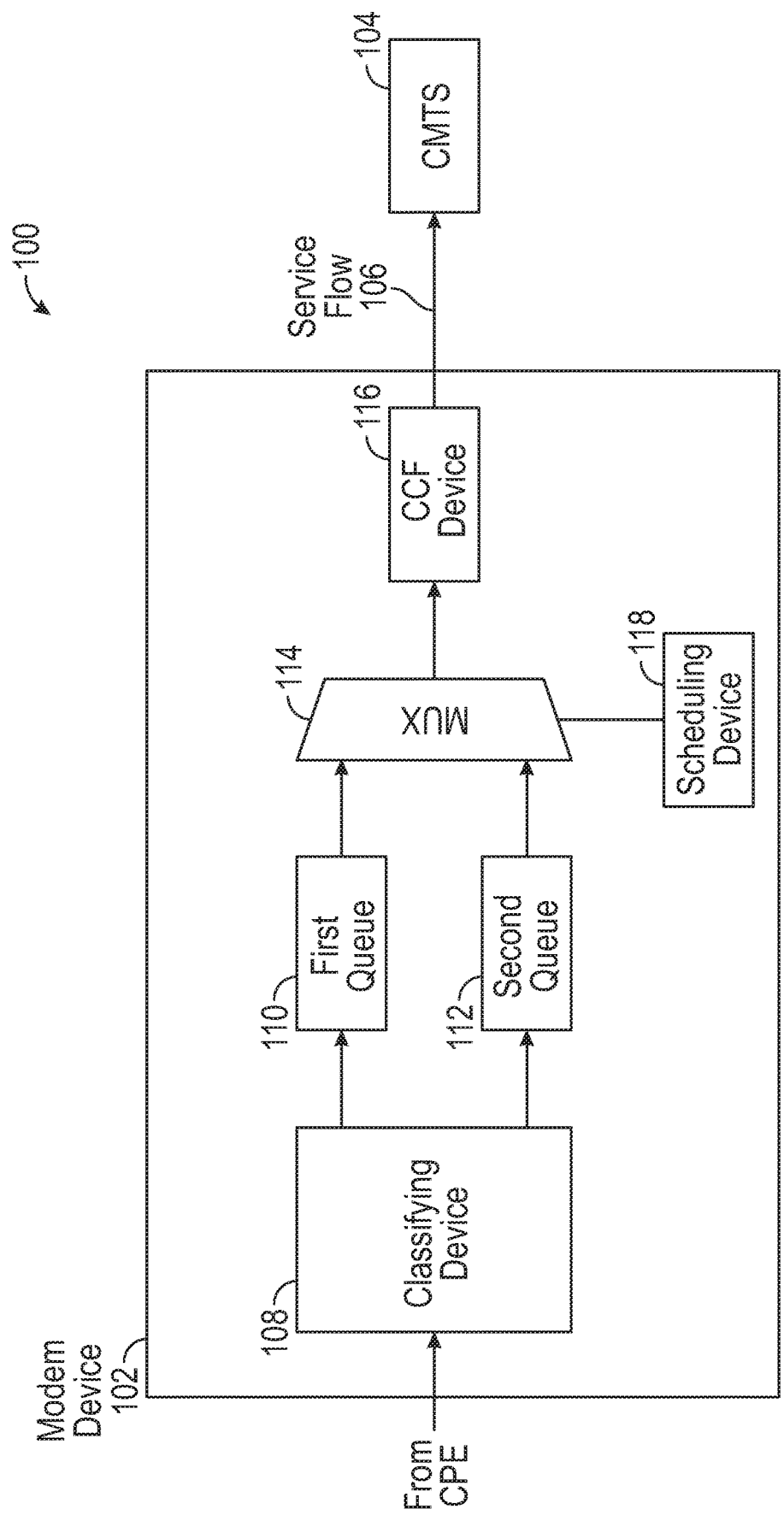
FIG. 1 is a block diagram of an operating environment for providing waterfall granting.

Waterfall granting may be provided. First, a plurality of grants may be received for a service flow. Then a first plurality of packets may be placed in a first queue associated with the service flow in response to determining that the first plurality of packets corresponding to the service flow are associated with a first quality of service level. Next, a second plurality of packets may be placed in a second queue associated with the service flow in response to determining that the second plurality of packets corresponding to the service flow are associated with a second quality of service level. The first plurality of packets in the first queue may then be serviced from the plurality of grants until all the first plurality of packets in the first queue are serviced before servicing any of the second plurality of packets in the second queue with remaining ones of the plurality of grants.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multi-Service flow (MSF) may comprise a conventional grant sharing process at a Cable Modem Termination System (CMTS) level. MSF may address bandwidth sharing on a long term average, but may not address latency. Consistent with embodiments of the disclosure, Multi-Queue (MQ) per service flow may comprise a grant sharing process, for example, at a Cable Modem (CM) level rather than at the CMTS level. MQ may address both bandwidth sharing and latency (i.e., waterfall granting).

MQ may address latency by allowing the CM to manage quality of service (QoS). Putting the QoS decision at the CM may be more reactive than the putting it at the CMTS for example. Consistent with embodiments of the disclosure, the CM can take one flow of grants and make the decision to either: i) give a grant to a signaling packet that just arrived; or ii) use the grant to accelerate the data path. Grant sharing at the CM may result in a faster reaction time and thus may lower latency. Unlike MSF, MQ may have multiple queues per service flow. MSF has one queue per service flow. In other words, unlike MSF that may comprise pure centralized scheduling, MQ may introduce a scheduling layer at the queue level within in a service flow. However, some scheduling functionality at CMTS may be used to ensure service flow level QoS.

FIG. 1 is a block diagram of an operating environment 100 for providing waterfall granting. As shown in FIG. 1, operating environment 100 may comprise a modem device 102, a Cable Modem Termination System (CMTS) 104, and a service flow 106 established between modem device 102 and CMTS 104. Service flow 106 may comprise a DOCSIS service flow and may be established between modem device 102 and CMTS 104 over, for example, a Hybrid Fiber-Coaxial (HFC) network. The HFC network may comprise a broadband network that combines optical fiber and coaxial cable.

CMTS 104 may be disposed in a headend of an MSO (e.g., a cable company) or its functionality may be carried out by a Remote Physical Layer Device (RPHY) disposed in the HFC network. CMTS 104 may provide, for example, high speed data services, such as cable Internet or Voice-Over-Internet Protocol, to subscribers. An RPHY may comprise shifting or distributing the physical layer (i.e., PHY) of a conventional cable headend CMTS to fiber nodes (e.g., RPHY nodes) in the HFC network. An RPHY may comprise circuitry to implement the physical layer of the CMTS.

Modem device 102 may comprise, for example, a cable modem and may receive data packets (i.e., packets) from Customer Premises Equipment (CPE). CPE may comprise, but are not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device.

Modem device 102 may comprise a classifying device 108, a first queue 110, a second queue 112, a multiplexer 114, a Continuous Concatenation and Fragmentation (CCF) device 116, and a scheduling device 118. While FIG. 1 shows modem device 102 having two queues (i.e., first queue 110 and second queue 112), embodiments of the disclosure may include any number of queues and is not limited to two. In other words, two queues are an example and there may be more than two queues per service flow. The number of queues may be based, for example, on a number of QoS levels that may be associated with a service flow. For example with mobile back haul, there may be four queues per service flow. In addition, while FIG. 1 shows one service flow (i.e., service flow 106), embodiments of the disclosure may include any number of service flows between modem device 102 and CMTS 104 and is not limited to one.

Figure 2:
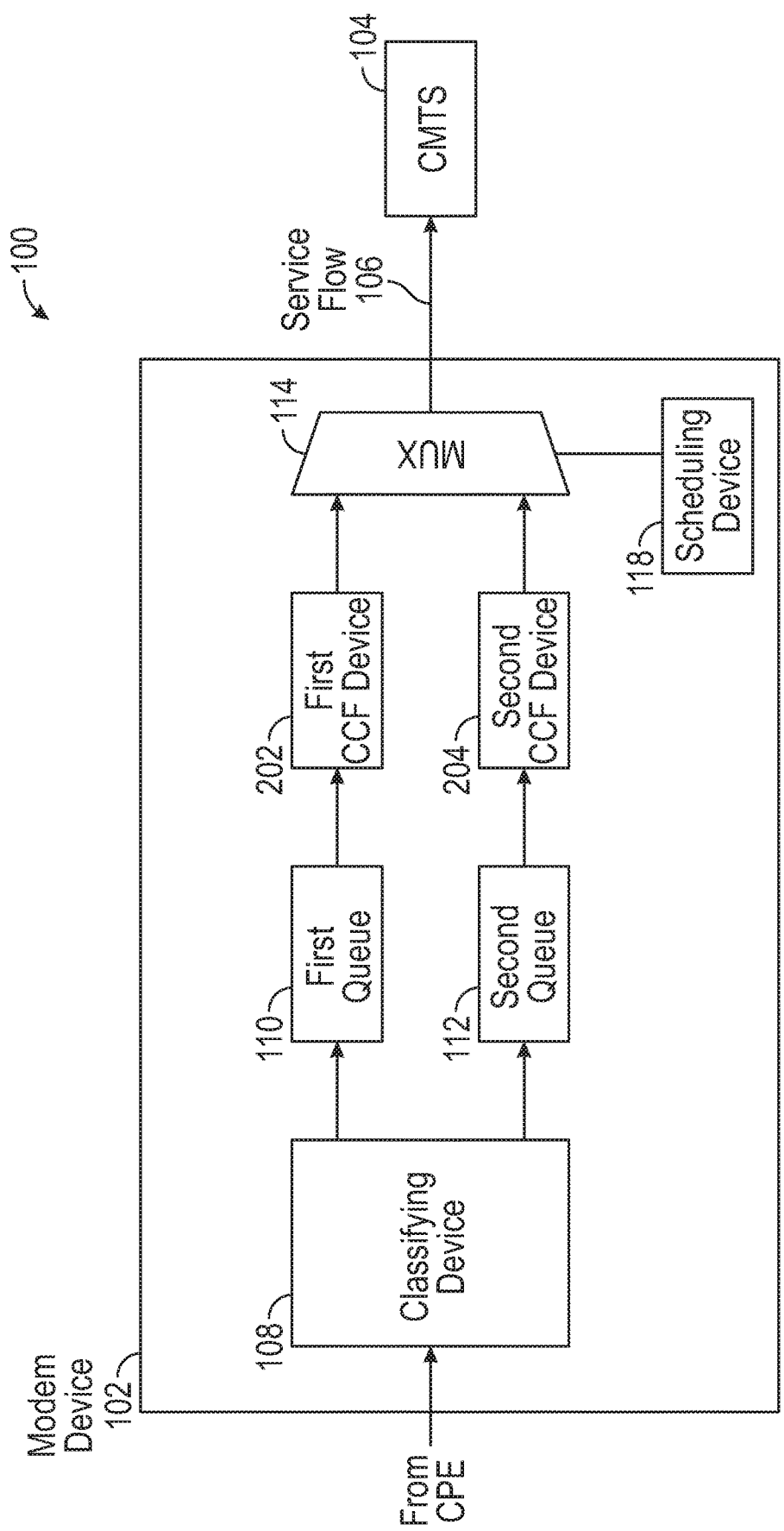
FIG. 2 is a block diagram of an operating environment for providing waterfall granting.

FIG. 2 is a block diagram of operating environment 100 for providing waterfall granting. As shown in FIG. 2, operating environment 100 may comprise modem device 102 in which CCF device 116 may be removed and a first CCF device 202 may be deployed between first queue 110 and multiplexer 114, and a second CCF device 204 may be deployed between second queue 112 and multiplexer 114.

Classifying device 108, CCF device 116, scheduling device 118, first CCF device 202, and second CCF device 204 may be embodied by a computing device 500 described in greater detail below with respect to FIG. 5. Notwithstanding, classifying device 108, CCF device 116, scheduling device 118, first CCF device 202, and second CCF device 204 may be embodied in hardware and/or in software (including firmware, resident software, micro-code, etc.).

Figure 3:
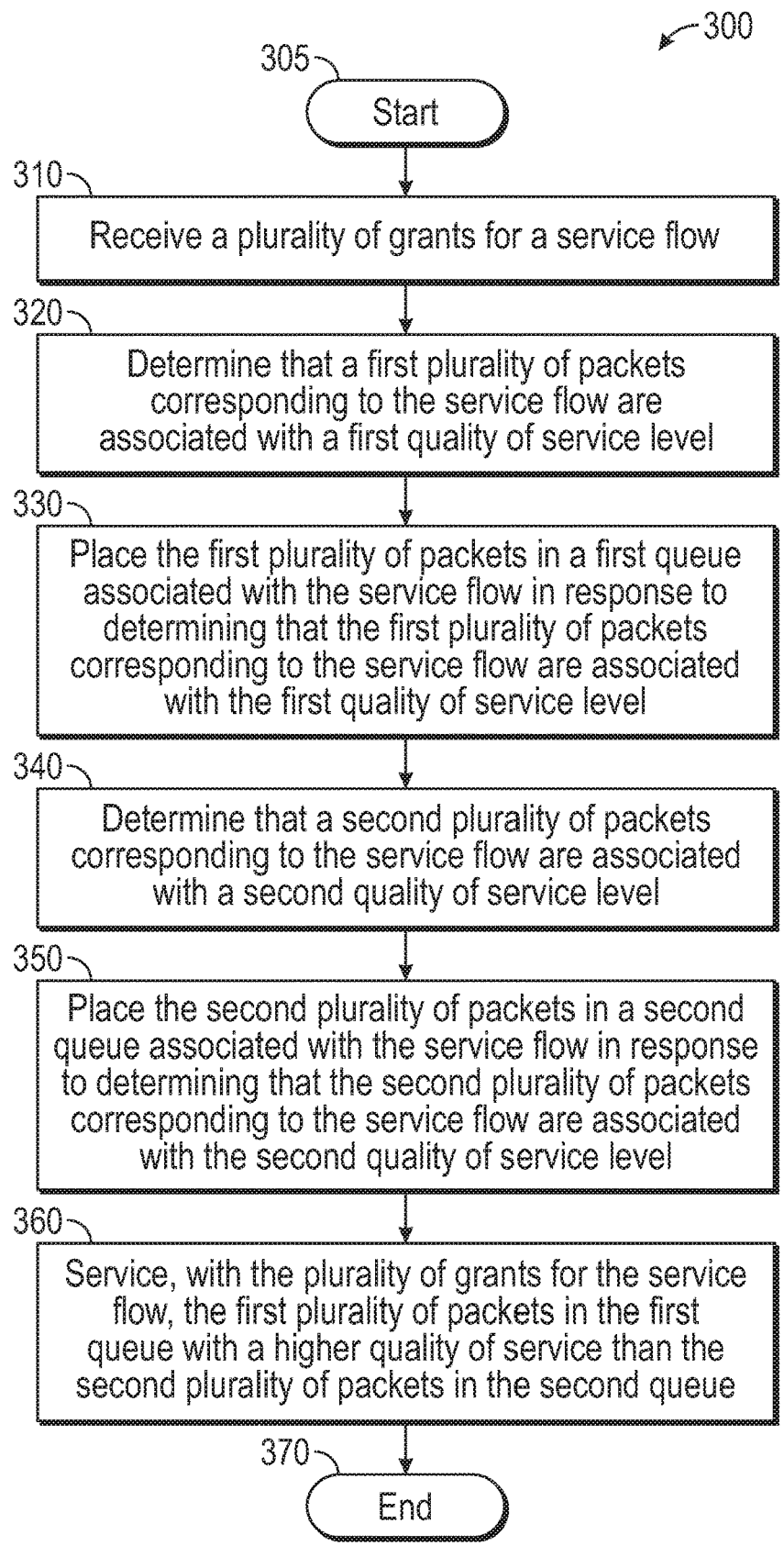
FIG. 3 is a flow chart of a method for providing waterfall granting.

FIG. 3 is a flow chart setting forth the general stages involved in a method 300 consistent with embodiments of the disclosure for providing waterfall granting. Method 300 may be implemented using a modem device 102 as described in more detail above with respect to FIG. 1 and FIG. 2. Ways to implement the stages of method 300 will be described in greater detail below.

Method 300 may begin at starting block 305 and proceed to stage 310 where modem device 102 may receive a plurality of grants for service flow 106. For example, the plurality of grants for service flow 106 may comprise a flow of grants received from CMTS 104 by scheduling device 118. Consistent with embodiments of the disclosure, CMTS 104 may continuously feed modem device 102 with grants. In other words, the flow of grants may be sent to modem device 102 without modem device 102 requesting them. For example, continuous granting may be used with 250 bytes every 0.2 ms. Consequently, embodiments of the disclosure may have 0.2 ms response time for signaling with rather than the 5 ms min in conventional systems. Because there may be no signaling, the data path may receive the benefit of lower latency. Moreover, to further increase efficiency, grant size and spacing may be changed based upon traffic patterns for example.

From stage 310, where modem device 102 receives the plurality of grants for service flow 106, method 300 may advance to stage 320 where modem device 102 may determine that a first plurality of packets corresponding to service flow 106 may be associated with a first quality of service level. For example, classifying device 108 may receive packets from the CPE. The packets received by classifying device 108 may include a data field (e.g., in the packet header) that may associate the corresponding packet with a particular quality of service level. For example, first quality of service level may comprise, but is not limited to, Low Latency (LL) and packets so designated may be associated with data for real-time applications such as interactive voice or video conversations. Upon receiving these packets, classifying device 108 may inspect the received packets and determine that a subset of the received packets (i.e., the first plurality of packets) may be associated with the first quality of service level.

Once modem device 102 determines that the first plurality of packets corresponding to service flow 106 may be associated with the first quality of service level in stage 320, method 300 may continue to stage 330 where modem device 102 may place the first plurality of packets in first queue 110 associated with service flow 106 in response to determining that the first plurality of packets corresponding to service flow 106 may be associated with the first quality of service level. For example, packets that classifying device 108 determines may be associated with the first quality of service level may be sent to first queue 110 by classifying device 108.

After modem device 102 places the first plurality of packets in first queue 110 associated with service flow 106 in response to determining that the first plurality of packets corresponding to service flow 106 may be associated with the first quality of service level in stage 330, method 300 may proceed to stage 340 where modem device 102 may determine that a second plurality of packets corresponding to service flow 106 may be associated with a second quality of service level. For example, classifying device 108 may receive packets from the CPE. As stated above, the packets received by classifying device 108 may include a data field (e.g., in the packet header) that may associate the corresponding packet with a particular quality of service level. For example, second quality of service level may comprise, but is not limited to, Best Efforts (BE) and packets so designated may not be associated with data for real-time applications. Upon receiving these packets, classifying device 108 may inspect the received packets and determine that a subset of the received packets (i.e., the second plurality of packets) may be associated with the second quality of service level.

From stage 340, where modem device 102 determines that the second plurality of packets corresponding to service flow 106 may be associated with the second quality of service level, method 300 may advance to stage 350 where modem device 102 may place the second plurality of packets in second queue 112 associated with the service flow in response to determining that the second plurality of packets corresponding to service flow 106 may be associated with the second quality of service level. For example, packets that classifying device 108 determines may be associated with the second quality of service level may be sent to second queue 112 by classifying device 108.

Once modem device 102 places the second plurality of packets in second queue 112 associated with service flow 106 in response to determining that the second plurality of packets corresponding to service flow 106 may be associated with the second quality of service level in stage 350, method 300 may continue to stage 360 where modem device 102 may service, with the plurality of grants for service flow 106, the first plurality of packets in first queue 110 with a higher quality of service than the second plurality of packets in second queue 112. For example, scheduling device 118 may have the plurality of grants for service flow 106 received from CMTS 104 and may apply the plurality of grants to the packets in first queue 110 and in second queue 112 accordingly to a policy. Scheduling device 118 may control multiplexer 114 and cause multiplexer 114 to release packets from first queue 110 or second queue 112 and provide the released packets to CCF device 116 that may prepare the data from the packets to be sent on service flow 106.

The aforementioned policy may comprise, but is not limited to, servicing the first plurality of packets in first queue 110 from the plurality of grants until all the first plurality of packets in first queue 110 are serviced before servicing any of the second plurality of packets in second queue 204 with remaining ones of the plurality of grants. In other words, with embodiments of the disclosure, first queue 110 may be empty before any packets in second queue 112 are serviced. Notwithstanding, the aforementioned policy may comprise other scheduling policies including, for example, Weighted Round Robin (WRR) when there may be a desire not to starve the low-priority queue (e.g., second queue 204). Accordingly, embodiments of the disclosure may provide more efficient bandwidth usage by giving to the lower priority packets the grants allocated from the higher priority packets when there are no higher priority packets to service. In addition, embodiments of the disclosure may improve latency by receiving grants without having to request them. Once modem device 102 services, with the plurality of grants for service flow 106, the first plurality of packets in first queue 110 with a higher quality of service than the second plurality of packets in second queue 112 in stage 360, method 300 may then end at stage 370.

Figure 4A:
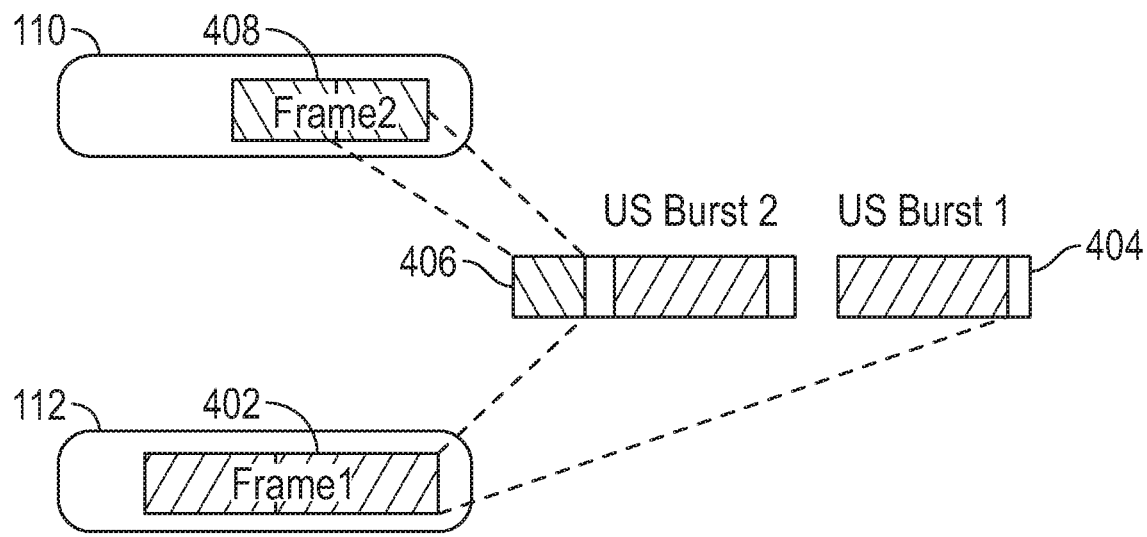
FIG. 4A illustrates Multi-Queue Continuous Concatenation and Fragmentation handling.
Figure 4B:
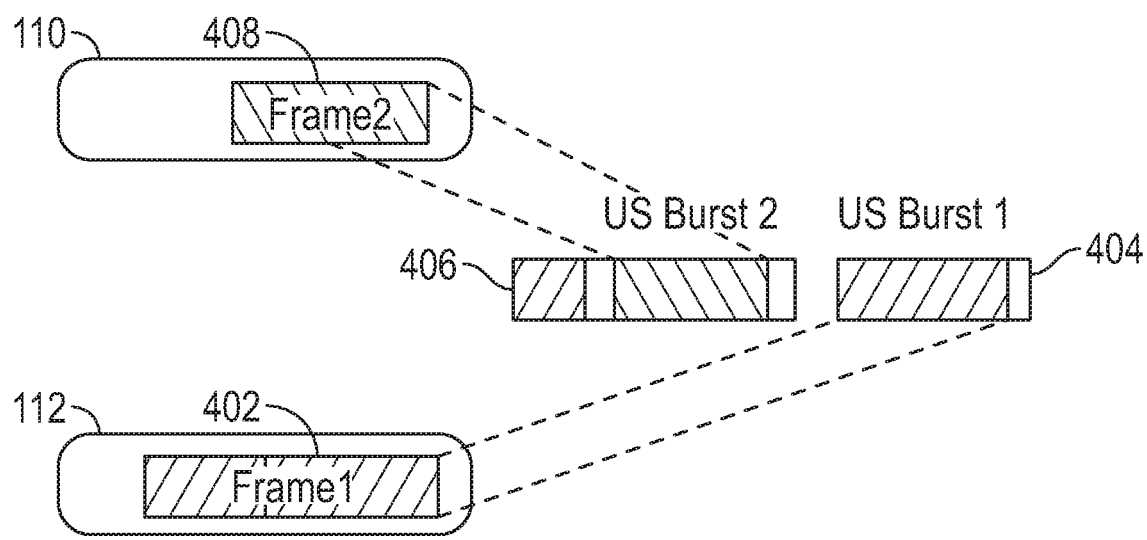
FIG. 4B illustrates Multi-Queue Continuous Concatenation and Fragmentation handling.

As shown in FIG. 4A and FIG. 4B, in some situations, first queue 110 may be empty and a packet 402 in second queue 112 may be in the process of being serviced. Packet 402 in second queue 110 being serviced may be too long for one CCF burst and may need to be spread over a first CCF burst 404 and a second CCF burst 406. During this servicing of packet 402 in second queue 110, a packet 408 may arrive in first queue 110. Given the single CCF device (i.e., CCF device 116) configuration of FIG. 1, the servicing of packet 402 from second queue 110 may be completed over the two bursts before the newly arrived packet in first queue 110 could begin to be serviced as shown in FIG. 4A. However, the configuration of FIG. 2 with a CCF device for each queue (i.e., first CCF device 202 and second CCF device 204), may provide for servicing packet 408 that arrived in first queue 110 before the second packet 402 is completely serviced as shown in FIG. 4B thus further improving latency.

Figure 5:
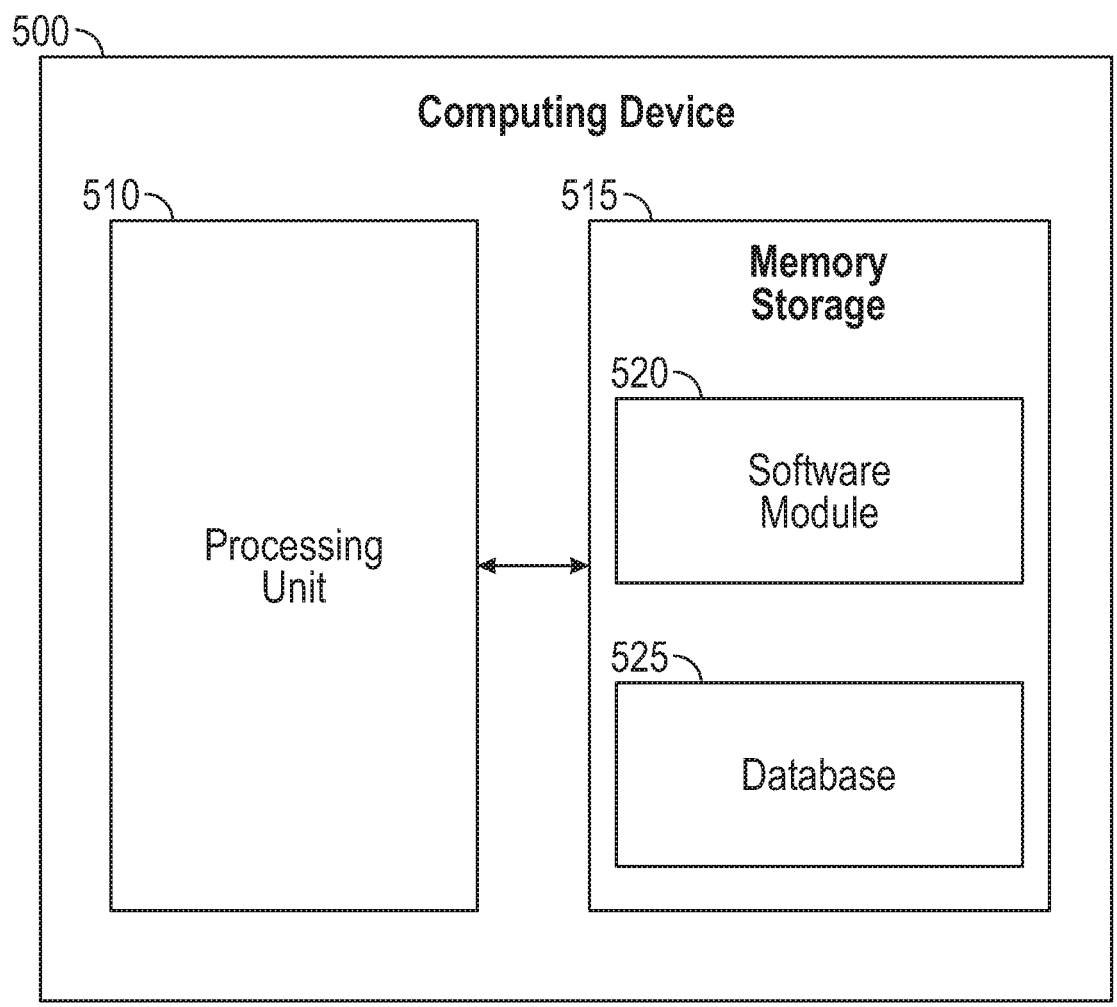
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform processes for waterfall granting, including for example, any one or more of the stages from method 300 described above with respect to FIG. 3. Computing device 500 may provide an operating environment for any one or more of classifying device 108, CCF device 116, scheduling device 118, first CCF device 202, and second CCF device 204. Classifying device 108, CCF device 116, scheduling device 118, first CCF device 202, and second CCF device 204 may operate in other environments and are not limited to computing device 500.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, an encoder, a transcoder, a camera, a load balancer or other similar microcomputer-based device. Computing device 500 may comprise any computer operating environment, such as hand-held devices, multi-processor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 and FIG. 2 may be integrated onto a single integrated circuit. Such an SOC device may include one or more processing units, graphics units, communications units, system virtualization units and various application functionality of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving, by a modem device, a plurality of grants for a service flow;
    determining, by the modem device, that a first plurality of packets corresponding to the service flow are associated with a first quality of service level;
    placing, by the modem device, the first plurality of packets in a first queue associated with the service flow in response to determining that the first plurality of packets corresponding to the service flow are associated with the first quality of service level;
    determining, by the modem device, that a second plurality of packets corresponding to the service flow are associated with a second quality of service level;
    placing, by the modem device, the second plurality of packets in a second queue associated with the service flow in response to determining that the second plurality of packets corresponding to the service flow are associated with the second quality of service level; and
    servicing, by the modem device with the plurality of grants for the service flow, the first plurality of packets in the first queue with a higher quality of service than the second plurality of packets in the second queue, wherein servicing the first plurality of packets in the first queue with the higher quality of service than the second plurality of packets in the second queue comprises:
        servicing the first plurality of packets with a first continuous concatenation and fragmentation device connected between the output of the first queue and a multiplexer of the modem device, and
        servicing the second plurality of packets with a second continuous concatenation and fragmentation device connected between the output of the second queue and the multiplexer of the modem device.

2. The method of claim 1, wherein servicing the first plurality of packets in the first queue with a higher quality of service than the second plurality of packets in the second queue comprises servicing the first plurality of packets in the first queue from the plurality of grants until all the first plurality of packets in the first queue are serviced before servicing any of the second plurality of packets in the second queue with remaining ones of the plurality of grants.

3. The method of claim 1, wherein receiving the plurality of grants for the service flow comprises receiving the plurality of grants from a Cable Modem Termination System (CMTS) that is servicing the service flow.

4. The method of claim 1, wherein receiving the plurality of grants comprises receiving at least one of the plurality of grants in response to a request.

5. The method of claim 1, wherein receiving the plurality of grants comprises receiving at least one of the plurality of grants without being requested.

6. The method of claim 1, wherein receiving the plurality of grants comprises receiving at least one of the plurality of grants in response to a request associated with a one of the second plurality of packets.

7. The method of claim 1, wherein determining that the first plurality of packets corresponding to the service flow are associated with the first quality of service level comprises determining that the first plurality of packets corresponding to the service flow are associated with the first quality of service level based upon information obtained from each of the first plurality of packets.

8. The method of claim 1, wherein determining that the second plurality of packets corresponding to the service flow are associated with the second quality of service level comprises determining that the second plurality of packets corresponding to the service flow are associated with the second quality of service level based upon information obtained from each of the second plurality of packets.

9. The method of claim 1, wherein the modem device comprises a cable modem device.

10. A non-transitory computer-readable medium that stores a set of instructions which when executed by a modem device perform a method comprising:
    receiving a plurality of grants for a service flow;
    determining that a first plurality of packets corresponding to the service flow are associated with a first quality of service level;
    placing the first plurality of packets in a first queue associated with the service flow in response to determining that the first plurality of packets corresponding to the service flow are associated with the first quality of service level;

determining that a second plurality of packets corresponding to the service flow are associated with a second quality of service level;
placing the second plurality of packets in a second queue associated with the service flow in response to determining that the second plurality of packets corresponding to the service flow are associated with the second quality of service level; and
servicing, with the plurality of grants for the service flow, the first plurality of packets in the first queue with a higher quality of service than the second plurality of packets in the second queue, wherein servicing the first plurality of packets in the first queue with the higher quality of service than the second plurality of packets in the second queue comprises:
 servicing the first plurality of packets with a first continuous concatenation and fragmentation device connected between the output of the first queue and a multiplexer of the modem device, and
 servicing the second plurality of packets with a second continuous concatenation and fragmentation device connected between the output of the second queue and the multiplexer of the modem device.

11. The non-transitory computer-readable medium of claim 10, wherein servicing the first plurality of packets in the first queue with a higher quality of service than the second plurality of packets in the second queue comprises servicing the first plurality of packets in the first queue from the plurality of grants until all the first plurality of packets in the first queue are serviced before servicing any of the second plurality of packets in the second queue with remaining ones of the plurality of grants.

12. The non-transitory computer-readable medium of claim 10, wherein receiving the plurality of grants for the service flow comprises receiving the plurality of grants from a Cable Modem Termination System (CMTS) that is servicing the service flow.

13. The non-transitory computer-readable medium of claim 10, wherein receiving the plurality of grants comprises receiving at least one of the plurality of grants in response to a request.

14. The non-transitory computer-readable medium of claim 10, wherein receiving the plurality of grants comprises receiving at least one of the plurality of grants without being requested.

15. The non-transitory computer-readable medium of claim 10, wherein receiving the plurality of grants comprises receiving at least one of the plurality of grants in response to a request associated with a one of the second plurality of packets.

16. The non-transitory computer-readable medium of claim 10, wherein determining that the first plurality of packets corresponding to the service flow are associated with the first quality of service level comprises determining that the first plurality of packets corresponding to the service flow are associated with the first quality of service level based upon information obtained from each of the first plurality of packets.

17. The non-transitory computer-readable medium of claim 10, wherein determining that the second plurality of packets corresponding to the service flow are associated with the second quality of service level comprises determining that the second plurality of packets corresponding to the service flow are associated with the second quality of service level based upon information obtained from each of the second plurality of packets.

18. The non-transitory computer-readable medium of claim 10, wherein the modem device comprises a cable modem device.

19. A system comprising:
a memory storage; and
a processing unit disposed in a modem device coupled to the memory storage, wherein the processing unit is operative to:
 receive a plurality of grants for a service flow;
 determine that a first plurality of packets corresponding to the service flow are associated with a first quality of service level;
 place the first plurality of packets in a first queue associated with the service flow in response to determining that the first plurality of packets corresponding to the service flow are associated with the first quality of service level;
 determine that a second plurality of packets corresponding to the service flow are associated with a second quality of service level;
 place the second plurality of packets in a second queue associated with the service flow in response to determining that the second plurality of packets corresponding to the service flow are associated with the second quality of service level; and
 service, with the plurality of grants for the service flow, the first plurality of packets in the first queue with a higher quality of service than the second plurality of packets in the second queue, wherein the processing unit being operative to service the first plurality of packets in the first queue with the higher quality of service than the second plurality of packets in the second queue comprises the processing unit being operative to:
  service the first plurality of packets with a first continuous concatenation and fragmentation device connected between the output of the first queue and a multiplexer of the modem device, and
  service the second plurality of packets with a second continuous concatenation and fragmentation device connected between the output of the second queue and the multiplexer of the modem device.

20. The system of claim 19, wherein the modem device comprises a cable modem device.

* * * * *